UNITED STATES PATENT OFFICE.

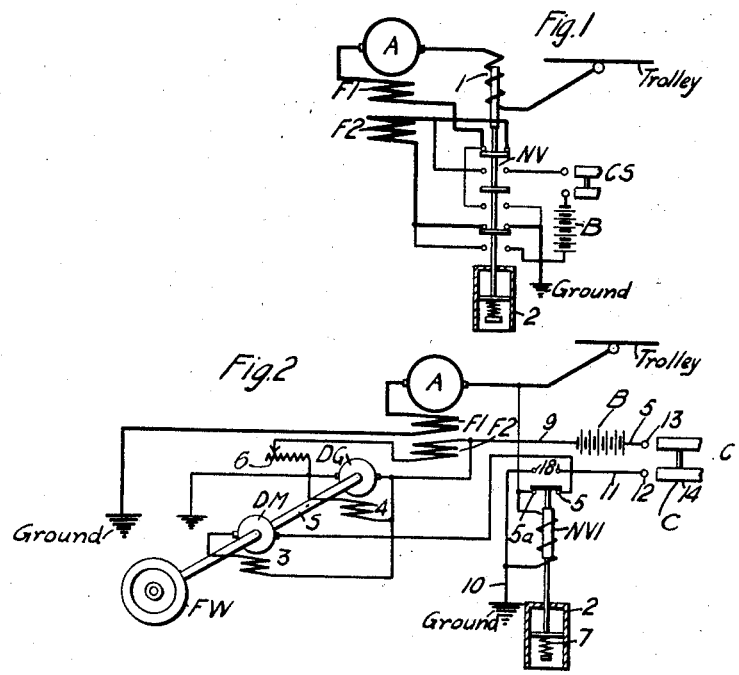

RUDOLF E. HELLMUND, OF SWISSVALE, PENNSYLVANIA, ASSIGNOR TO WESTINGHOUSE ELECTRIC AND MANUFACTURING COMPANY, A CORPORATION OF PENNSYLVANIA.

CONTROL SYSTEM.

1,317,293.  Specification of Letters Patent.  Patented Sept. 30, 1919.

Original application filed September 25, 1914, Serial No. 863,504. Divided and this application filed November 7, 1917. Serial No. 200,655.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Control Systems, of which the following is a specification, this application being a division of my copending application, Serial No. 863,504, filed September 25, 1914, patented Dec. 11, 1917, No. 1,249,954.

My invention relates to systems of control, and it has special reference to means for preventing the occurrence of "flash-over" conditions in dynamo-electric machines, more particularly electric railway motors, under predetermined conditions.

One object of my invention is to provide simple and reliable means of the above-indicated character which shall effectively obviate the possibility of "flash-over" of electric motors upon the resumption of supply-circuit voltage after a temporary interruption thereof, such as is caused by the trolley wheel or other current-collecting member passing under a section break or otherwise momentarily leaving the supply-circuit conductor.

More particularly, in high-voltage direct current systems and in the case of locomotives of large capacity, it may be advisable, for economical and other reasons, to provide means for preventing "flash-over" of the motor, the most common cause of which is the sudden resumption of supply-circuit energy after the temporary interruption thereof at section breaks, etc. Whenever the supply of energy is resumed, a heavy rush of current through the deënergized motor windings occurs, which causes great field-flux distortion and relatively high voltage between commutator segments. This condition arises by reason of the fact that the flux set up by the armature current, upon resumption of supply-circuit energy, readily traverses the entirely laminated armature core, and, consequently, builds up to a normal value much more rapidly than the main field flux which encounters the high magnetic reluctance of the solid iron or steel frame castings and which is, therefore, partly damped out by eddy currents.

According to my present invention, I provide means for obviating the above-mentioned operating difficulties by energizing a part or all of the main field windings from some auxiliary source of energy when the supply-circuit energy is temporarily interrupted. The main field flux is thus maintained at a predetermined value during the interruption and, as a result, when the supply-circuit energy is resumed, the predominance of armature ampere-turns over field ampere-turns is prevented, and "flash-over" conditions do not obtain. In one form, my invention comprises the use of a small auxiliary motor-generator or dynamotor, driven from the supply circuit, for energizing a predetermined part of the field winding. In this case, the motor end of the auxiliary machine is also deënergized upon an interruption of the connection to the supply circuit; however, if the machine is provided with a fly-wheel or inherently has considerable fly-wheel effect, the energization of the main field winding from the generator end of the machine will be maintained for a predetermined period. Longer energy interruptions may be provided for by means of suitable automatic devices for switching in an independent source of energy to supply current to the main field winding at the end of the said period.

In the accompanying drawing, Figure 1 is a diagrammatic view of a system of control embodying my invention; and Fig. 2 is a similar view of a modification of the invention.

Referring to Fig. 1 of the drawing, the system shown comprises a supply-circuit conductor marked "Trolley", a return circuit conductor marked "Ground"; an electric motor having an armature A and a field magnet winding F of the series type which may be divided into a plurality of parts F1 and F2, and auxiliary source of energy, such as a battery B, that is variably connected to the part F2 of the field winding, and a "no-voltage release" switch NV.

Any familiar and suitable form of "no-voltage release" switch, with a graduated return to prevent disconnection of the auxiliary source of energy before the field is properly built up, may be employed. The switch may take a form similar to that illustrated in Fig. 1 and described below. Whereas, for the sake of simplicity and clearness, the switch in question is not illustrated in the other systems shown, it will be understood that it is preferably employed in the various systems.

The system illustrated in Fig. 1 comprises, in addition, a portion of a motor-controlling switch CS, the complete connections of which are omitted, for the sake of simplicity. When the series-connected actuating coil 1 of the switch NV is energized from the supply circuit, the switch assumes its upper position shown in the drawing, in opposition to the momentary action of the dash-pot 2 or other suitable retarding means. The armature and the two portions of the field winding are then connected in series-circuit relation. Upon failure of the supply circuit voltage, the switch drops to its lower position, thereupon disconnecting the part F2 of the field winding from the motor circuit and connecting it to the battery B, provided the controlling-switch CS occupies any "on" position, such field connections, of course, not being desired when the motor is voluntarily disconnected from the supply circuit.

Assuming that, upon a temporary interruption of supply-circuit voltage, the parts of the systems shown occupy their respective emergency positions, the operation thereof, which, it will be understood will apply, in a general sense, to the various other systems to be hereinafter described, may be set forth as follows: the temporary battery connection maintains the field flux at any desired value during the interruption. When the supply-circuit energy is resumed, the field ampere-turns will thus immediately be of a normal or other predetermined value, irrespective of the slow building up of the field flux by the motor current. The predominance of armature ampere-turns over field ampere-turns is prevented in this way, and flash-over conditions do not obtain.

The system illustrated in Fig. 2 comprises a supply circuit and an electric motor similar to that shown in Fig. 1; a small motor-generator or, preferably, a dynamotor of familiar form which is customarily employed for control and lighting purposes in many types of locomotives; a battery B; a portion of a controlling-switch C; and a no-voltage graduated release switch NV1.

The dynamotor preferably comprises a motor armature winding DM and a generator armature winding DG that are mounted on a common shaft S, a series-connected field magnet winding 3 and a second field magnet winding 4 that is connected in parallel with the generator armature. The machine is either designed to have relatively great fly-wheel effect or is provided with a suitable flywheel FW. Energy is supplied to the dynamotor from the supply circuit through coöperating stationary and movable contact members 5 and 5ª of the switch NV1 when in its lower position or energized condition; and the generator armature winding DG is connected through a suitable variable resistor 6 across the portion F2 of the main field magnet winding.

The controlling-switch C may take any usual form, and, for the sake of clearness and simplicity, only the portion thereof that I employ in effecting the preventive action under consideration is illustrated. The no-voltage release switch NV1 may be of any suitable form, such as that illustrated in Fig. 1, with the addition of means, such as a spring 7, for biasing the switch to its upper position, for example, for a purpose to be described.

Assuming that, just prior to an interruption of supply-circuit energy, the various parts of the system occupy their respective illustrated positions, the operation of the system may be briefly described as follows: The flywheel effect of the dynamotor will maintain a suitable rotative speed thereof, and, consequently, energization of the portion F2 of the main field winding for a predetermined period of time, which will usually extend until supply-circuit energy is resumed. However, if the energy is interrupted for a longer period, then the deënergized no-voltage graduated release switch, actuated by the biasing spring 7, reaches its upper position, wherein the movable contact member 5ª makes contact with a pair of stationary contact members 18.

A circuit is thereby established from one side of the battery B, through conductor 9, the portion F2 of the main field winding, the resistor 6 to "ground," and from "ground," through conductor 10, stationary and movable contact members 18 and 5ª of the switch NV1, conductor 11, control fingers 12 and 13—which are bridged by a contact segment 14 of the controlling switch C in any operative position—and conductor 5 to the other side of the battery B. The field winding F2 may thus be continually energized until supply-circuit energy is resumed to energize the switch NV1 and return it to its lower position, or until the controlling switch C is voluntarily returned to the "off" position.

It may be observed at this time that the systems hereinbefore described are readily adapted for use in the well-known "field control" systems. The excitation of the field winding F2 may be easily regulated by the variation of the number of active cells of the system shown in Fig. 1, and of the resistor 6 in Fig. 2. Moreover, a separately excited portion of the main field winding may be of advantage in limiting the maximum speed of the motor-driven vehicle to any desired value.

I do not wish to be restricted to the specific circuit connections or arrangement of parts herein set forth, as various further modifications may be made within the spirit and scope of my invention. I desire, therefore, that only such limitations shall be imposed as are indicated in the appended claims.

I claim as my invention:

1. In a system of control, the combination with a main source of supply and a main dynamo-electric machine connected thereto and having an armature and a field winding, of auxiliary exciting means for furnishing energy to said field winding, and control means for automatically modifying the circuit connections of the auxiliary exciting means under conditions of interruption of energy from said main source to insure the maintenance of a relatively high degree of main field excitation independently of the main source.

2. In a system of control, the combination with a main source of supply and a main dynamo-electric machine connected to effect an exchange of energy therewith, said machine comprising an armature and a field winding, of auxiliary exciting means for furnishing energy to said field winding, means for influencing such excitation under normal conditions by said exchange of energy, and control means for automatically modifying the circuit connections of said auxiliary exciting means, upon interruption of energy from the main source, to substitute the effect of said modified connections, for a material time and to a relatively high degree, for the influence of said energy exchange upon the field excitation prior to the interruption.

3. In a system of control, the combination with a supply circuit and a dynamo-electric machine having an armature and a field winding, of an auxiliary motor-generator for furnishing exciting energy to said field winding, a relay device responsive to supply-circuit voltage for varying the auxiliary-motor connections, and mechanical-energy-storing means other than said motor-generator for effecting a continuance of such excitation under conditions of an interruption of supply-circuit voltage.

4. In a system of control, the combination with a supply circuit and a dynamo-electric machine having an armature and a field winding, of an auxiliary motor-generator normally driven from said supply circuit for furnishing exciting energy to said field winding, means responsive to supply-circuit voltage for varying the auxiliary-motor connections, and a flywheel member for returning stored mechanical energy to said motor-generator under conditions of an interruption of supply-circuit energy.

5. In a control system, the combination with a supply circuit, and a dynamo-electric machine having a field magnet winding, of an auxiliary dynamo-electric machine for energizing a predetermined part of said field winding upon a temporary interruption of energy from said supply circuit, a driving motor for said machine, a relay device for varying the driving-motor connections upon said interruption and a flywheel associated with said auxiliary machine to maintain said energization for a predetermined period.

6. In a control system, the combination with a supply circuit, and a dynamo-electric machine having a field magnet winding, of an auxiliary motor-generator set energized from said supply circuit and having relatively great flywheel effect for energizing a predetermined part of said field winding upon a temporary interruption of energy from said supply circuit and for maintaining said energization for a period thereafter, and means independent of said supply circuit for continuing the energization after said period.

7. In a control system, the combination with a supply circuit, and an electric motor having an armature and a field magnet winding, of an auxiliary motor-generator receiving energy from said supply circuit and adapted to deliver energy to a predetermined part of said field winding upon a temporary interruption of energy from said supply circuit, a flywheel associated with said motor-generator to maintain the field winding energization for a predetermined period thereafter, and an independent source of energy for automatically continuing the energization after said period.

8. In a system of control, the combination with a main source of supply and a dynamo-electric machine having an armature and a field winding, of an independent source of energy, and means including said independent source and a modification of the circuit thereof for effecting the energization of said field winding upon the occurrence of predetermined abnormally weak electrical conditions in the machine.

9. In a system of control, the combination with a supply circuit and a dynamo-electric machine having an armature and a field winding, of an auxiliary motor-generator normally driven from said supply circuit for furnishing exciting energy to said field winding, an independent source of energy, and means dependent upon the interruption of supply-circuit energy for effecting the operation of said motor-generator from said independent source.

In testimony whereof I have hereunto subscribed my name this 24th day of Oct., 1917.

RUDOLF E. HELLMUND.

Copies of this patent may be obtained for five cents each, by addressing the "Commissioner of Patents, Washington, D. C."